US008259010B2

(12) United States Patent
Ische et al.

(10) Patent No.: US 8,259,010 B2
(45) Date of Patent: Sep. 4, 2012

(54) QUALIFYING COARSE POSITION INJECTION IN POSITION DETERMINATION SYSTEMS

(75) Inventors: Marc A. Ische, San Diego, CA (US); Dominic Gerard Farmer, Los Gatos, CA (US); Ashok Bhatia, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 12/786,103

(22) Filed: May 24, 2010

(65) Prior Publication Data
US 2011/0084876 A1     Apr. 14, 2011

Related U.S. Application Data

(60) Provisional application No. 61/251,629, filed on Oct. 14, 2009.

(51) Int. Cl.
*G01S 19/06* (2010.01)
(52) U.S. Cl. .................................. 342/357.43
(58) Field of Classification Search ............. 342/357.43
See application file for complete search history.

(56) References Cited

U.S. PATENT DOCUMENTS

| | | | |
|---|---|---|---|
| 5,488,559 A * | 1/1996 | Seymour ..................... 701/208 |
| 5,774,829 A * | 6/1998 | Cisneros et al. ............. 701/213 |
| 5,982,324 A * | 11/1999 | Watters et al. ........... 342/357.29 |
| 5,999,124 A | 12/1999 | Sheynblat |
| 6,249,252 B1 * | 6/2001 | Dupray ......................... 342/450 |
| 6,289,280 B1 | 9/2001 | Fernandez-Corbaton et al. |
| 6,420,999 B1 | 7/2002 | Vayanos |
| 6,473,030 B1 * | 10/2002 | McBurney et al. ....... 342/357.43 |
| 6,515,617 B1 * | 2/2003 | Demers et al. ........... 342/357.64 |
| 6,603,428 B2 * | 8/2003 | Stilp ............................. 342/457 |
| 7,864,108 B2 * | 1/2011 | Kurata ..................... 342/357.43 |
| 7,898,473 B2 * | 3/2011 | Sairo et al. ............... 342/357.43 |
| 7,991,408 B2 * | 8/2011 | Paulson et al. ............. 455/456.3 |
| 8,094,067 B2 * | 1/2012 | Malkos et al. ........... 342/357.42 |
| 2002/0145557 A1 * | 10/2002 | Roy et al. ................. 342/357.02 |
| 2006/0217130 A1 | 9/2006 | Rowitch et al. |
| 2007/0063896 A1 * | 3/2007 | Alban et al. .................. 342/458 |

(Continued)

FOREIGN PATENT DOCUMENTS
WO    W002077661 A2    10/2002
(Continued)

OTHER PUBLICATIONS

Goze T et al., "Secure User-Plane Location (SUPL) Architecture For Assisted GPS (A-GPS)", Advanced Satellite Mobile Systems, 2008. ASMS 2008. 4TH, IEEE, Piscataway, NJ, USA, Aug. 26, 2008, pp. 229-234, XP031393759, ISBN: 978-1-4244-2160-2.

(Continued)

*Primary Examiner* — Thomas Tarcza
*Assistant Examiner* — Frank J McGue
(74) *Attorney, Agent, or Firm* — Arnold J. Gum

(57) ABSTRACT

A position determining system (PDS) receiver gathers independent location information from multiple sources. These multiple pieces of location information are analyzed to determine consistency of location. If the location is consistent among the various independently gathered location information, then the location information is injected into the PDS positioning process for more efficient acquisition and positioning. Otherwise, if inconsistency is found, then no location information is injected into the PDS positioning process.

24 Claims, 5 Drawing Sheets

U.S. PATENT DOCUMENTS

| | | | |
|---|---|---|---|
| 2007/0132636 A1* | 6/2007 | Young et al. | 342/357.15 |
| 2007/0132639 A1* | 6/2007 | Korneluk et al. | 342/464 |
| 2007/0275734 A1* | 11/2007 | Gaal et al. | 455/456.6 |
| 2008/0111737 A1* | 5/2008 | Haverkamp et al. | 342/357.09 |
| 2008/0262728 A1* | 10/2008 | Lokshin et al. | 701/216 |
| 2010/0285813 A1* | 11/2010 | Harper | 455/456.1 |
| 2011/0037644 A1* | 2/2011 | Yeshayahu | 342/357.25 |
| 2011/0068977 A1* | 3/2011 | Thomson et al. | 342/357.43 |

FOREIGN PATENT DOCUMENTS

| | | |
|---|---|---|
| WO | WO2004016032 | 2/2004 |

OTHER PUBLICATIONS

International Search Report and Written Opinion—PCT/US2010/052732—ISA/EPO—Apr. 21, 2011.

Virball V G et al., "A GPS integrity channel based fault detection and exclusion algorithm using maximum solution separation", Position Location and Navigation Symposium, 1994, IEEE Las Vegas, NV, USA Apr. 11-15, 1994, New York, NY, USA,IEEE, New York, NY, USA, Apr. 11, 1994, pp. 747-754, XP010117801, D0I:10.1109/PLANS.1994.303385, ISBN: 978-0-7803-1435-1.

* cited by examiner

QUALIFYING COARSE POSITION INJECTION IN POSITION DETERMINATION SYSTEMS

CROSS REFERENCE TO RELATED APPLICATION

This application claims the benefit of U.S. Provisional Patent Application No. 61/251,629 filed Oct. 14, 2009, entitled QUALIFYING COARSE POSITION INJECTION IN POSITION DETERMINATION SYSTEMS, the disclosure of which is expressly incorporated by reference herein in its entirety.

TECHNICAL FIELD

The present teachings relate, in general, to position determination systems (PDSs) and, more particularly, to qualification of coarse position injection in PDSs.

BACKGROUND

PDS include a various number of ground and space-based navigational systems. Ground-based systems, such as the OMEGA navigation system, the Russian Alpha system, the Long Range Navigation (LORAN) system, and the like each use terrestrial radio signals for establishing position. PDSs also include satellite positioning systems (SPSs) and Global Navigation Satellite Systems (GNSS), such as Global Positioning System (GPS), Galileo, Glonass and BeiDou. SPSs, such as GPS, use a constellation of between 24 and 32 medium Earth orbit satellites that transmit precise radio frequency (RF) signals that allow SPS receivers to determine their current location, the time, and their velocity. An SPS receiver follows a positioning process to calculate its position by carefully timing the signals sent by three and preferably four or more of the constellation of SPS satellites.

Each satellite continually transmits messages containing the time the message was sent, a precise orbit for the satellite sending the message, i.e., the ephemeris, and the general system health and rough orbits of all SPS satellites, i.e., the almanac. These signals essentially travel at the speed of light through space and slightly slower through the Earth's atmosphere. The timing of each signal can be used to calculate the distance to each satellite thereby establishing that the SPS receiver is approximately on the surfaces of spheres centered at each satellite. The SPS receiver also uses, when appropriate, the knowledge that the SPS receiver is on or near the surface of a sphere representative of the Earth. This information is then used to estimate the position of the SPS receiver as the intersection of sphere surfaces. The resulting coordinates are converted to a more convenient form for the user such as latitude and longitude, or location on a map, and then displayed.

However, if the SPS timing measurements are used alone, these calculations can only occur after the SPS receiver has acquired the satellite signals of the three, or preferably four or more SPS satellites at the beginning of the positioning process. The length of time that it takes the receiver to acquire the satellite signals and fix the position is directly related to how much information the SPS receiver has before beginning the acquisition process. In standalone SPS, this acquisition and positioning process can be quite long during a cold start operation, during which the SPS receiver does not have much, if any, prior location information. This generally occurs the first time that a user turns on an SPS receiver. A cold start may be turned into a warm start by providing certain bits of information including one or more of the receiver approximate location, SPS time, almanac, ephemeris data, and the like. The less information the receiver has, the larger the search space, and the longer the acquisition and positioning time. Conversely, the more information the receiver has, the smaller the search space, and the shorter the acquisition and positioning time.

A seed location is an approximate location of the GPS/SPS receiver that is utilized, in conjunction with appropriate ephemeris and/or almanac information to determine satellite search windows. One common source of a seed location is from the most recent fix. This method assumes that the receiver has not dramatically changed its location. With this method, a SPS receiver will calculate its location and store that location information in memory for future use as a seed location. If, however, a seed location is used that is no longer accurate, the initial search windows used by the receiver will be inaccurate, resulting potentially in a failed initial search and in longer overall fix times. For example, a user in Dallas, Tex. uses and operates a SPS receiver in the Dallas area. The receiver stores location information indicating the Dallas area. The user turns the SPS receiver off and flies to San Diego, Calif. The user restarts the SPS receiver in San Diego and, during the SPS positioning process, the SPS receiver may utilize the stored seed location information from the local memory resulting is a false seed location and a failed initial search. When the seed location information is substantially wrong, the SPS receiver will determine the initial search windows based on this erroneous information and may fail to find the satellites within their respective Doppler and time offset windows. In this situation, the SPS receiver searches until the search times out, which could be a relatively substantial amount of time. After timing out, the receiver deletes the incorrect location information and will then perform a cold start, typically with much larger search window assumptions, which adds significant time to the acquisition and positioning process.

Because of the usefulness of a seed location to SPS receivers, technology has been developed for the receiver to actively obtain a seed location from various external sources, such as a cell tower or cell site or a short range wireless transmitter or the like. For purposes of this application, a short range wireless transmitter can be any number of RF transmitters, such as used in Bluetooth Special Interest Group's BLUETOOTH™ transmitters, Wi-Fi Aliance's WIFI™ or similar transmitters using the IEEE 802.11x wireless local area network (WLAN) protocols, femtocells, transponder devices, and similar devices. A SPS receiver having such technology may actively communicate with a cell site or wireless access point and either receive a seed location directly from the source or access a database to determine the location of the particular cell site or access point. However, the information obtainable from these kinds of sources may not always be reliable. For example, a company providing a wireless access point at a registered location may move the location of the wireless access point without updating the registered location. Therefore, if the SPS receiver polls the access point and looks up the location registered to that access point, the seed location would be incorrect. Similarly, should a SPS receiver happen across a cellular test site, any information received from that cell location would generally be unreliable as testing facilities do not typically spend the time and effort to set the location parameters. In other cases, the location may have never been set or may have been accidentally entered as an erroneous value. Using an erroneous seed position may result in a failed initial search and substantial delays to the overall location attempt.

BRIEF SUMMARY

Various representative aspects of the present teachings are directed to an SPS receiver that gathers independent location information from multiple sources. The location information is are analyzed to determine consistency. If the location information provided by multiple sources are consistent with the mobile device being at one location, then a seed location derived from the location information provided by multiple sources is injected into the SPS positioning process. The derived seed location may consist of using location information from one of the multiple sources, of a weighted mean of location information from multiple sources, possibly via signal strength, or of a calculated location based on multilateration.

Additional representative aspects of the present teachings are directed to methods for position location in a PDS. These methods include receiving a request to determine a position of a PDS receiver, and, responsive to the request, retrieving location information of wireless devices in proximity to the PDS receiver. The methods also include comparing the retrieved location information of the wireless devices to determine consistency of the retrieved location information with a common seed location, and, in response to determining the retrieved location information to be consistent with the common seed location, injecting the common seed location into a positioning process of the PDS receiver.

Further representative aspects of the present teachings are directed to SPS receivers. These SPS receivers include a processor, a memory coupled to the processor, and a location retrieval application stored on the memory. When executed by the processor, the location retrieval application configures the SPS receiver to obtain location data from wireless devices in proximity to the SPS receiver. There is also a consistency process stored on the memory. When executed by the processor, the consistency process determines whether the location data is consistent with a common seed location There is also a SPS process, in which, when executed by the processor, it determines parameters for locating at least one SPS satellite used to determine a global position of the SPS receiver. When the executing consistency process determines the location data to be consistent with the common seed location, the common seed location is injected into the SPS process.

Still further representative aspects of the present teachings are directed to computer readable media including program code stored thereon. The program code includes code to receive a request to determine a position of a PDS receiver, code, executable in response to the request, to retrieve location data from wireless devices in proximity to the PDS receiver, code to compare the retrieved location data to determine consistency of the location data with a common seed location, and code, executable in response to determining the retrieved location data to be consistent with the common seed location, to inject the common seed location into a positioning process of the PDS receiver.

Additional representative aspects of the present teachings are directed to PDS receivers. These PDS receivers include means for receiving input requesting a position of the PDS receiver, means for wirelessly retrieving location information from wireless devices in proximity to the PDS receiver, computer readable storage means for storing the location information, program code to determine a consistency of the location information with a common seed location, and program code to define a PDS positioning process. The PDS receivers also include means for processing the program code to determine consistency and the program code to define the PDS positioning process. The means for processing injects the common seed location into the PDS positioning process when the processed program code to determine consistency finds consistency between the location information and the common seed location.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific aspects disclosed may be readily utilized as a basis for modifying or designing other structures for carrying out the same purposes of the present teachings. It should also be realized by those skilled in the art that such equivalent constructions do not depart from the technology of the teachings as set forth in the appended claims. The novel features which are believed to be characteristic of the present teachings, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following description taken in conjunction with the accompanying drawings.

DETAILED DESCRIPTION

The method and apparatus described herein may be used with various global satellite positioning systems (SPS), such as the United States Global Positioning System (GPS), the Russian GLONASS system, the European Galileo system, the proposed Chinese Beidou system, regional SPS, such as India's proposed Indian Regional Navigational Satellite System (IRNSS) and Japan's proposed regional system, QZSS, and any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and others. The term "SPS signals", as used herein, is intended to include SPS-like signals from pseudolites or equivalents of pseudolites.

Figure 1:
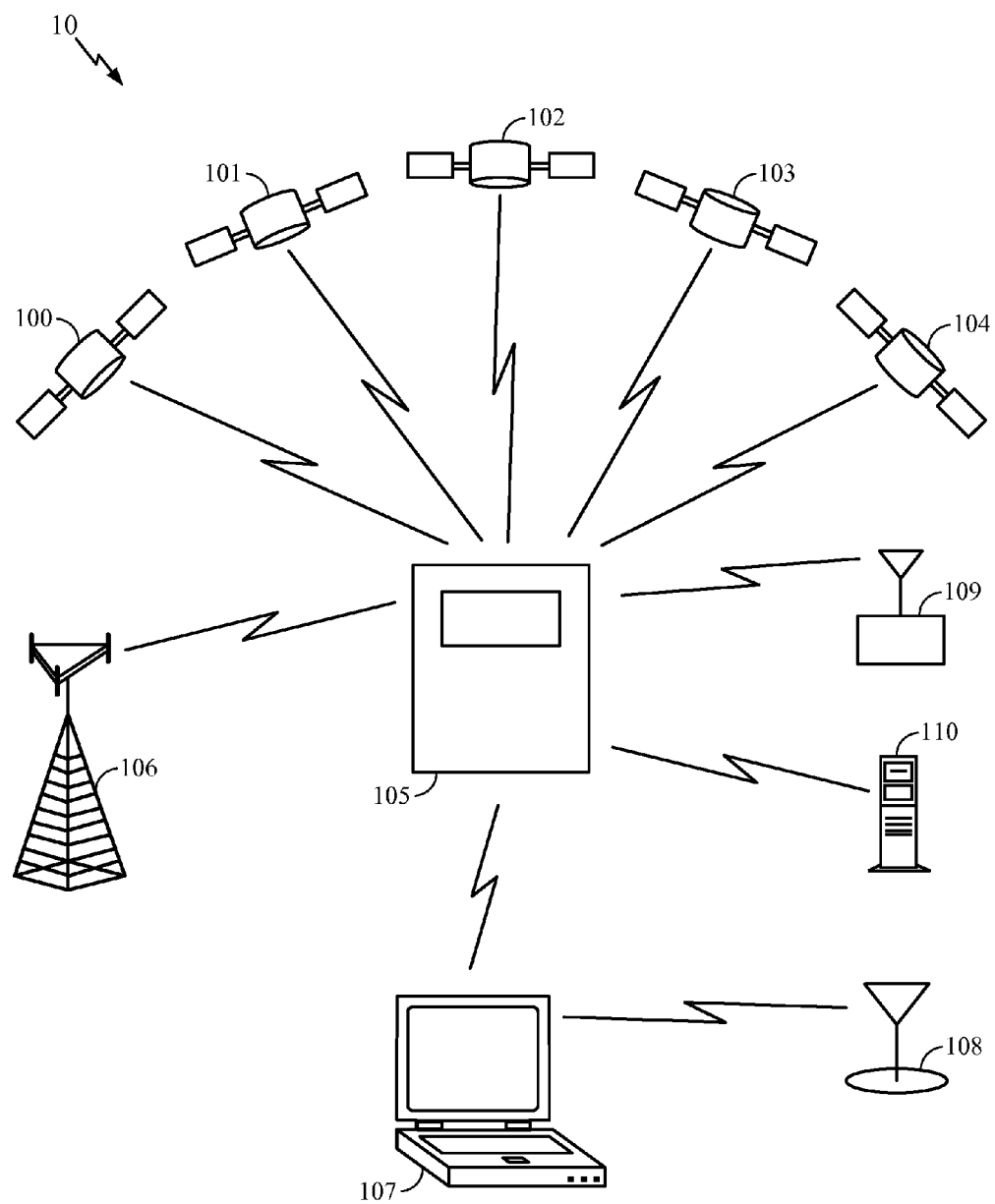
FIG. 1 is a block diagram of a satellite positioning system configured according to one aspect of the present teachings.

Turning now to FIG. 1, a block diagram of an SPS system 10 is illustrated according to one aspect of the present teachings. The SPS system 10 includes various satellites. As illustrated in FIG. 1, satellites 100-104 are shown as a part of the SPS system 10. However, some of the satellites 100-104 may actually belong to additional systems. They may be used together, as a part of the SPS system 10, for various purposes.

A mobile device 105 is configured to acquire, receive, and process the signals from the satellites 100-104, which may be from an SPS, such as a GPS, Galileo, GLONASS, GNSS, a system that uses satellites from a combination of these systems, or any SPS developed in the future. This SPS/PDS positioning process begins with the mobile device 105 searching for location data from alternative sources, such as a cell site 106, a laptop computer 107, and a wireless transmitter 109, which could include any number of various transmitters, such as BLUETOOTH™ transmitters, an 802.11x wireless access point, a femtocell, a transponder device, a digital television (DTV) transmitter, a commercial radio transmitter (e.g., FM or AM radio), and the like. In some cases the location data is converted to an actual location. In other cases, the location data itself, rather than the actual location is used. For example, a time difference of arrival (TDOA) between two cell sites measurement may be received and used.

The mobile device 105 can establish communication with the cell site 106 in either uni- or bi-directional communication. The mobile device 105 and the cell site 106 may provide various forms of location data, such as the mobile country code (MCC), the cell identifier (ID), which would enable a lookup of the location of the cell in a base station almanac, latitude, longitude and altitude. The latitude, longitude and altitude of the cell may be used as a seed location or combined with the location from other transceivers as well as timing and/or signal strength information to calculate a seed location of the mobile device. In uni-directional communication, the mobile device 105 receives at least the cell ID. When the cell site location and related location information is actively maintained by a communications provider, this information is generally reliable. However, when carriers that have not actively maintained or uniquely provisioned the cell site information, the location data received by the mobile device 105 may not be completely reliable. During bi-directional communication, the mobile device 105 will receive at least the MCC and the cell site ID. The information received during bi-directional communication is highly reliable because the identities of the mobile device 105, the cell site 106, and the network that operates over the cell site 106 are verified. In this case, the location of the base stations and transceivers may be verified for accuracy via bi-directional communication.

The mobile device 105 also establishes communication with the laptop computer 107 in order to obtain additional location data. The mobile device 105 establishes an ad hoc communication with the laptop computer 107, in which the mobile device 105 communicates directly with the laptop computer 107. The mobile device 105 may receive, when available, two sets of location data from the laptop computer 107. The first set of location data comes from location data stored in applications running on the laptop computer 107. Applications often use location data entered by a user in its operation. For example, forms data from web entries may include a home address for the laptop user. The second set of location data comes from the identifier (ID) of a short range wireless transmitter 108, to which the laptop computer 107 is currently also connected. The source of the data would be identified for possible consideration regarding whether the data should be used in calculating the seed position. For example, if the various location sources are consistent with the location in the forms data, the forms data has a high probability of being the location of the mobile device. If the various location sources disagree, the forms data probably has no relevance. The short range wireless transmitter 108, which may be any of the possible devices noted with regard to the wireless transmitter 109, provides an identifier that is often registered with a location. The mobile device 105 uses the ID from the short range wireless transmitter 108 to look up the associated location in a base station almanac or other table of transceiver locations and related information indexed by transceiver identifier. This lookup can be performed at a database stored locally on the mobile device 105 or on a remote database, such as a remote database 110. This wireless access point ID information is also obtained through a separate connection directly with the wireless transmitter 109.

Location data may also be obtained by the mobile device 105 from a satellite signal transmitted by one or more of the satellites 100-104. The mobile device 105 may receive these satellite signals outside of the acquisition part of the SPS positioning process. In such instances, the location data within these satellite signals is used. While the satellite location data is highly reliable when received from satellites that have already been acquired, the information that is received outside of acquisition is not as reliable. This information may be old, or the mobile device 105 may not have enough information to extract the accurate location data from the satellite signals.

The mobile device 105 also receives location data locally from the previously stored SPS location data. In the majority of operations of the mobile device 105, the stored location data from the previous SPS acquisition and positioning process is generally accurate. However, this information loses reliability as the age of the data increases. When evaluating stored SPS location data, assumptions are made that, during the time that the old SPS location data is stored, the mobile device 105 may travel at a certain maximum rate of speed, i.e., a motion model. For example, if the stored SPS location information is only 20 minutes old, the maximum rate of speed for the motion model would be equivalent to the maximum speed travelled in an automobile, i.e., approximately 60-80 mile per hour (mph). Thus, if the age of a specific piece of stored SPS location information only estimates a maximum travelling distance of 5-10 miles, then the stored SPS location information may still be accurate. In contrast, when stored SPS location information is more than an hour old, it may be assumed that air travel could be involved, increasing the maximum travel speed for the motion model to be that of a jet liner. Thus, a stored SPS location information with an age of 2 hours would be assumed to be as much as 500-600 miles from the previous location. In this instance, the stored SPS location information is assumed to be unreliable and/or untrustworthy.

As the mobile device 105 compiles such location information, it does not immediately inject the data into the SPS acquisition routine. Instead, the mobile device 105 runs a consistency process of each independent piece of data. Only when the location information checks out as consistent, does it get injected into the SPS acquisition routine. For example, the user who began in Dallas, Tex. and flew to San Diego, Calif. would have stored SPS location data indicating the area in Dallas, Tex. that the user was last positioned with the mobile device 105. Instead of immediately injecting this old SPS location data stored on the mobile device 105, the mobile device 105 gathers other data from the cell site 106, laptop computer 107, and the wireless transmitter 109. On comparison of this data, the mobile device 105 discovers that the previous SPS location data stored on the mobile device 105 is not consistent with the other location data received from the cell site 106, laptop computer 107, and the wireless transmitter 109. Because of this inconsistency, the previously stored SPS location information is not injected into the acquisition and positioning process of the mobile device 105. This result avoids the undesirable situation described previously in which the mobile device 105 attempts to acquire the satellites using the satellite location information for Dallas, Tex., and then times out after a considerable wait period when it cannot find the satellites at the expected locations. In case location data (e.g., TDOA data), rather than an actual location, is used for the consistency process, the seed location can be converted to an estimated TDOA for the comparison.

Figure 2:
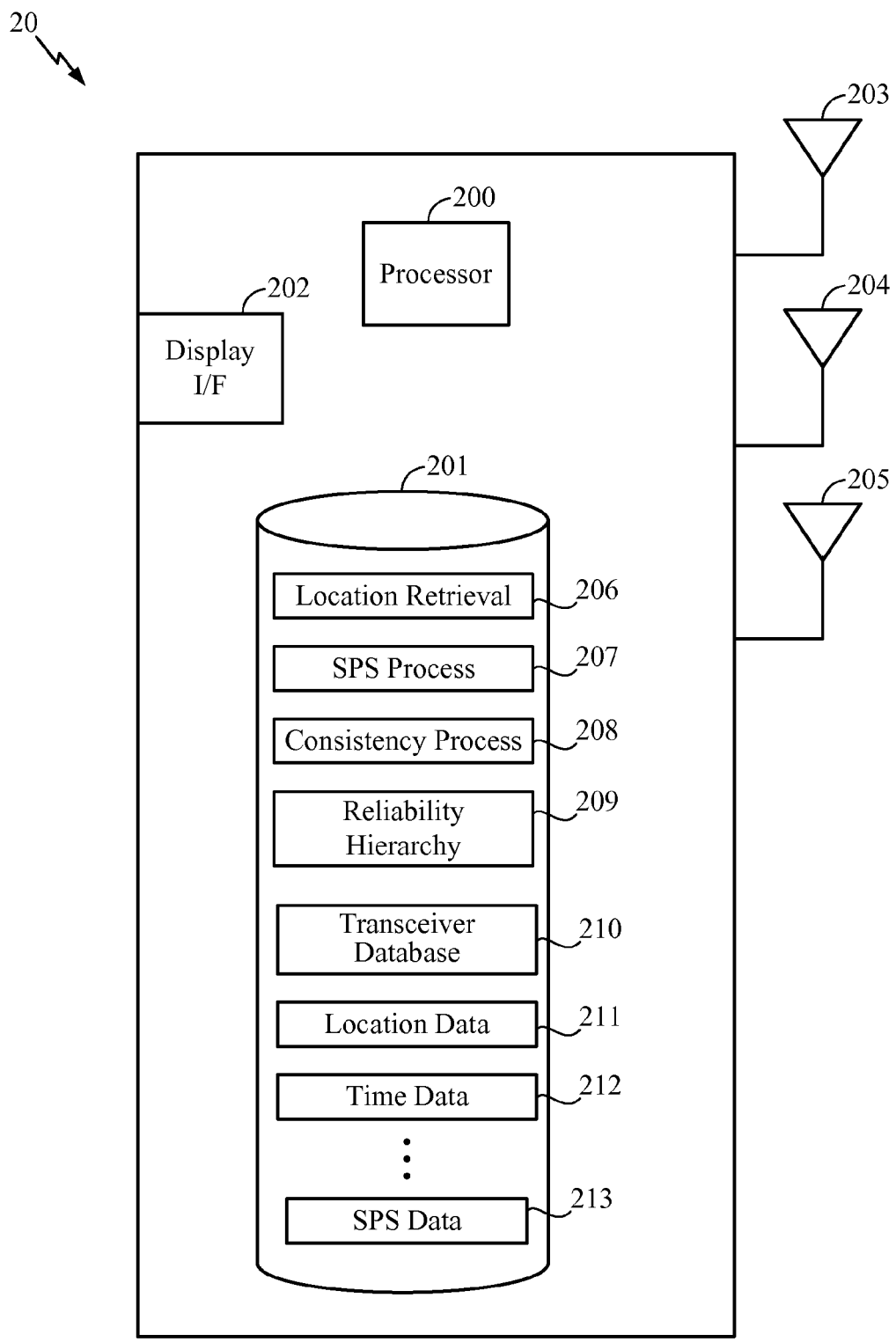
FIG. 2 is a block diagram illustrating a mobile device configured according to one aspect of the present teachings.

FIG. 2 is a block diagram illustrating a mobile device 20 configured according to one aspect of the present teachings. The mobile device 20 includes a processor 200. Depending on the application or particular aspect implemented, the processor 200 may include all processing hardware, including microprocessors, microcontrollers, digital signal processors, graphical processing units, and the like. Any processing functionality performed by mobile device 20 is performed by the processor 200. The mobile device 20 also includes a display interface 202, which controls the rendering of data onto a user display (not shown) on the mobile device 20, multiple antennas 203-204, which are compatible with various wireless protocols including a GPS receiver, and a memory 201.

The memory 201 stores various applications and operating systems that underlie the operation of the mobile device 20. Regarding the various functionalities provided according to the described aspect of the present teachings, the memory 201 stores a location retrieval application 206, which, when executed by the processor 200, attempts to retrieve the location data from wireless devices found within a certain wireless proximity to the mobile device 20. For purposes of this application, "proximity" is used to mean the wireless range or antenna limits of any given receiver. The memory 201 also stores the SPS process 207, which, when executed by the processor 200, are used during acquisition and positioning to calculate where the expected satellite signals will be and what their expected receive frequencies will be all based on the location information of the mobile device 20 and relatively accurate time information. The memory 201 also stores a consistency process 208, which, when executed by the processor 200, compares each of the independent pieces of location data gathered by the mobile device 20 and determines whether or not the transceiver locations identified in such data is consistent with a hypothesized seed location for the mobile device 20.

The aspect described in FIG. 2 also stores a reliability hierarchy 209 in the memory 201. The reliability hierarchy 209 provides graduated levels of reliability depending on what type of location data is being considered. For example, WIFI™ identifiers are considered to have a low level of reliability, while the MCC is considered to have a very high level of reliability but also a higher degree of uncertainty. In various alternative aspects of the present teachings, in order to meet the criteria of the consistency process 208, all pieces of the collected data will be consistent with one another, allowing for varying degrees of uncertainty associated with each transceiver location(s). Using a reliability hierarchy, such as the reliability hierarchy 209, allows the consistency process 208 to be much more complex and allow location data injection in circumstances in which not all of the independent location data is consistent.

An example reliability hierarchy may start with current SPS signals, followed by recently stored SPS location data (i.e., 2 seconds old vs. 10 minutes old), the MCC and cell site ID, are generally of the same reliability. However, additional logic may be inserted into this hierarchy in which the MCC data is considered more reliable when it has been found consistently amount multiple neighboring locations while the cell site ID is found to be inconsistent. Finally, the lowest reliability would be found with WIFI™ IDs. In operation then, when the mobile device 20 has received various independent pieces of location data, running the consistency process 208 will compare the location data for each piece of data. However, if all of the data, except for one, is consistent, the determination made by the consistency process 208, as to whether or not to inject a seed location based upon consistent transceiver/transmitter locations or associated information, will be based on the consistent transceiver/transmitter locations or associated information. If there are multiple sources in disagreement, the signal sources that are higher in the reliability hierarchy 209 may be selected. Alternatively, a wider initial search window may be selected and the provided transceiver/transmitter locations may be ignored. For example, if the cell site ID, the MCC, and WIFI™ ID are all consistent, but the SPS signal received does not match, the consistency process 208 will determine that the data is inconsistent and select not to utilize a seed location based upon that data into the SPS process 207. In contrast, if the SPS signals, the MCC, cell site ID, and WIFI™ data are all consistent, but an older, stored SPS location data is inconsistent, the consistency process 208 may determine that the more unreliable older, stored SPS location data should be discarded, because it is lower down the reliability hierarchy 209, and the remaining consistent location data, being collectively from more reliable sources, should be injected into the SPS process 207. Similarly, non-carrier provisioned WIFI™ units would typically be of lower reliability and generally disregarded if inconsistent with higher reliability sources, such as base stations and related base station information such as MCC.

The memory 201 may also include a transceiver database 210, which maintains a record of the location of registered transceiver/transmitter locations, the location data 211, which represents location data maintained by various additional applications operable on the mobile device 20, the time data 212, which maintains a record of the current time, and the SPS data 213, which maintains the previously stored SPS location data.

It should be noted that in additional and/or alternative aspects of the present teachings, more complexity may be added to the consistency process 208 to make determining a seed location to inject into the SPS process 207 more accurate. Instead of utilizing an individual, transceiver location, a plurality of the transceiver locations and related transceiver information, such as timing and signal strength, may be taken and combined to create a more accurate seed location to inject. For example, once the reliability of the data is established, the consistency process 208 takes the location of a first cell site (determined through the cell site ID), a location of a short range wireless transmitter, and very recently stored SPS information and calculates an estimate of the more exact location of the mobile device 20 as the seed location. This seed location is then injected into the SPS process 207 for the acquisition and positioning process.

Figure 3:
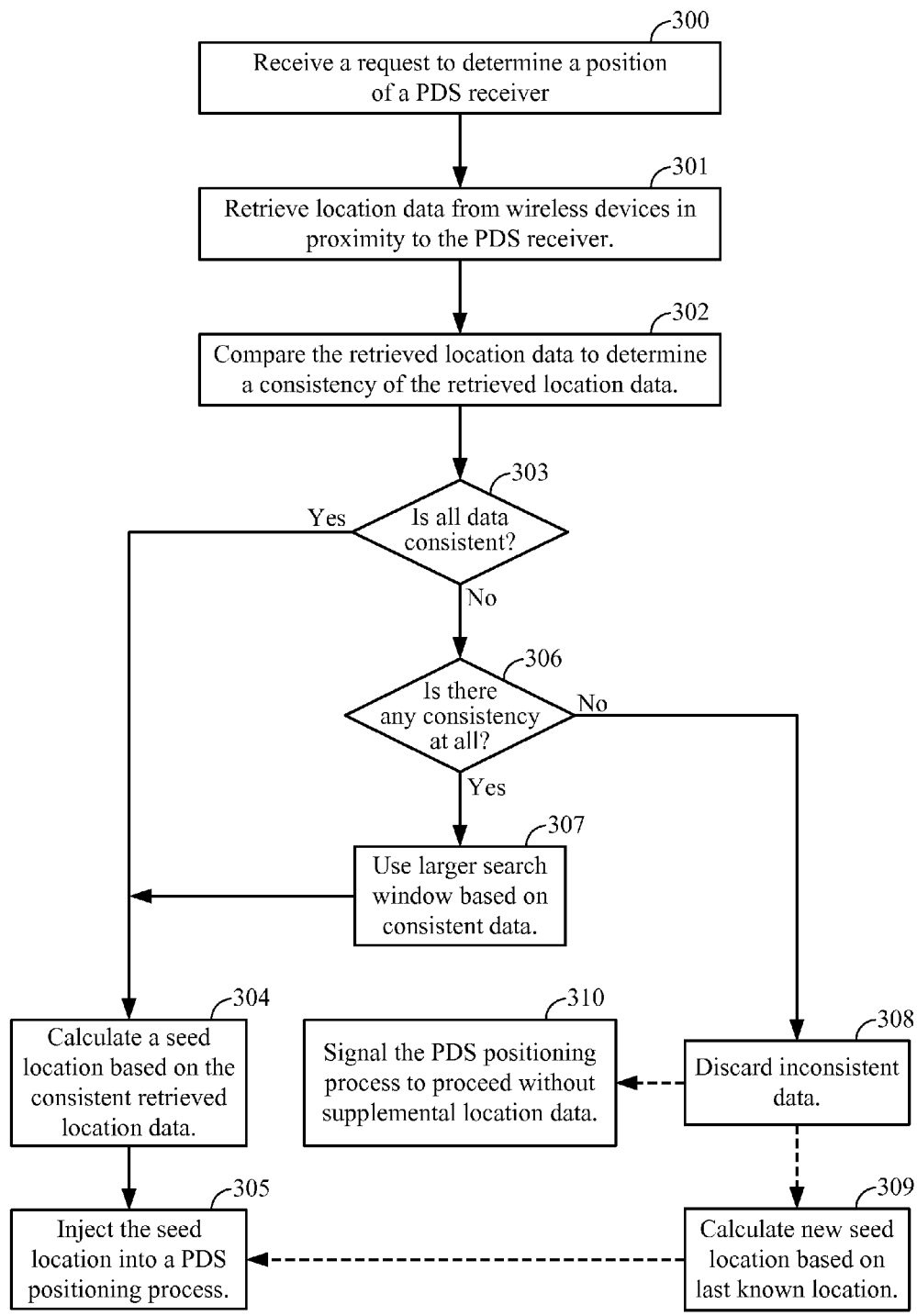
FIG. 3 is a flowchart illustrating functional blocks used to implement one aspect of the present teachings.

FIG. 3 is a flowchart illustrating functional blocks used to implement one aspect of the present teachings. In functional block 300, a request to determine a position of a PDS receiver is received. Responsive to this request, location data is retrieved, in functional block 301, from wireless transceivers/ transmitters in proximity to the PDS receiver. The retrieved location data is compared, in functional block 302, to determine the consistency of the locations provided by different transceivers/transmitters. In functional block 303, a determination is made whether the comparison resulted in consistency. Consistency is determined based upon whether the different transceivers are consistent with a common estimated location of the mobile device in light of transmission ranges, if known, signal strength of the signal source, and considering any recent location calculation data. If there is consistency, a seed location is calculated, in functional block 304, based upon the transceiver/transmitter information. This seed location is injected into a positioning process of the PDS receiver in functional block 305. Otherwise, when there is no consistency, another determination is made, in block 306, whether there is any consistency at all in the transceiver/transmitter information. If there is some consistency, then, in functional block 307, the consistent information used, in functional block 304, to calculate the seed location which will be injected into the PDS positioning process of block 305. If there is no consistency at all, then, in functional block 308, the inconsistent data is discarded. At this point, there is an optional progression. After discarding the inconsistent data, a new seed location may be calculated using the last known accurate location data, in functional block 309, or the PDS positioning process is signaled to proceed without supplemental location data, in functional block 310.

It should be noted that in additional aspects of the present teachings an image analysis function may be used to obtain or estimate a coarse location of the mobile device. For example, if a user takes a photograph of a landmark and sends that photograph to a recipient, the network could intercept a copy of the photograph and compare the image against images and locations of known landmarks maintained in an associated database. If the timing information associated with the photograph indicates that it was taken within a relatively short period of time, the network begins its image analysis to locate a coarse position of the landmark. It may then send such coarse position information to the mobile device for use comparing for consistency of location information. Similarly, in a variation of this particular aspect, when a request to determine a position occurs, the mobile device may search the recent photographs in memory and, if one is found within a reasonable period of time, the image may then be transmitted to the network for analysis to find a possible coarse location of the mobile device. Still another example of such image analysis technology that may be used to supply coarse location information is through image search features available on various mobile devices. As a user takes a picture of some landmark or building, a service provided by the wireless service provider may be used to search and compare against other images in a database or stored on the Internet to find additional information on the object, including a location of the object. Examples of such image search technology is found in mobile services such as Google, Inc.'s GOOGLE GOGGLES™ and Vodafone's OTELLO™ image search functionality.

Figure 4:
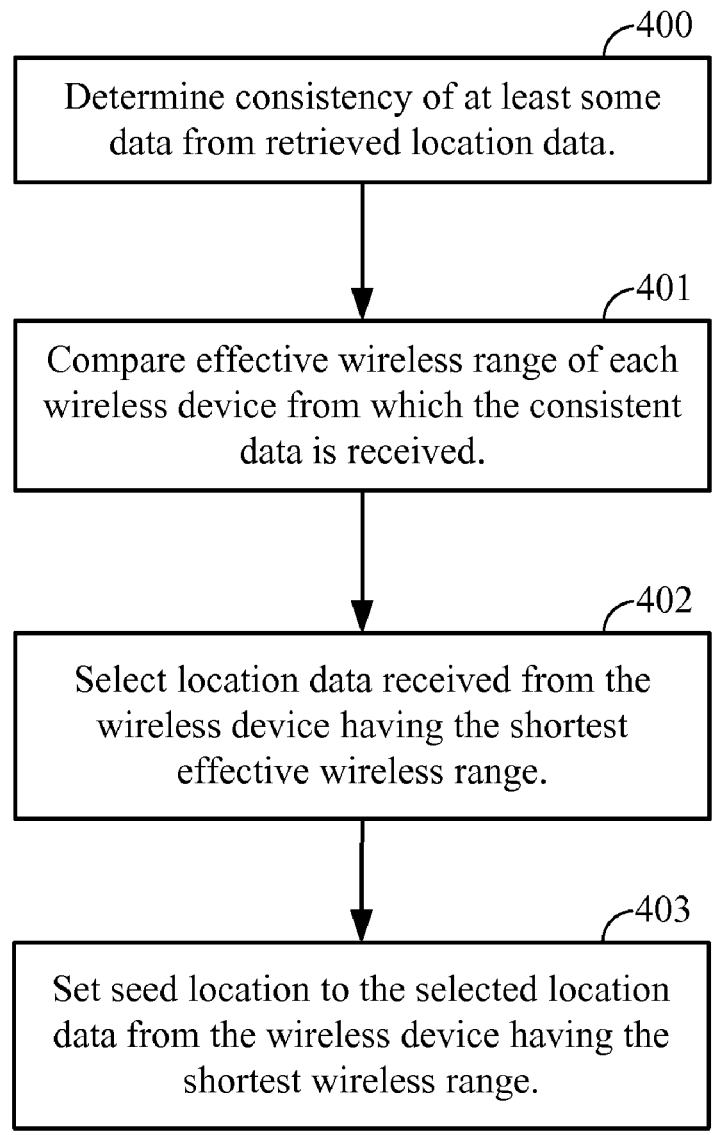
FIG. 4 is a flowchart illustrating functional blocks used to implement one aspect of the present teachings.

It should be noted that in various implementations of the different aspects of the present teachings, selection or calculation of the seed location may be made from one of the pieces of retrieved location information from various neighboring mobile devices. FIG. 4 is a flowchart illustrating functional blocks used to implement one aspect of the present teachings. In functional block 400, consistency of at least some data from retrieved location data is determined The effective wireless ranges of each wireless device from which the consistent data is received is compared, in functional block 401. Location data is selected, in block 402, that was received from the wireless device having the shortest effective wireless range. The seed location is set to the selected location data from the wireless device having the shortest wireless range in block 403.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. Although the communication apparatus may not store all of the instructions and/or data on a computer readable medium.

Figure 5:
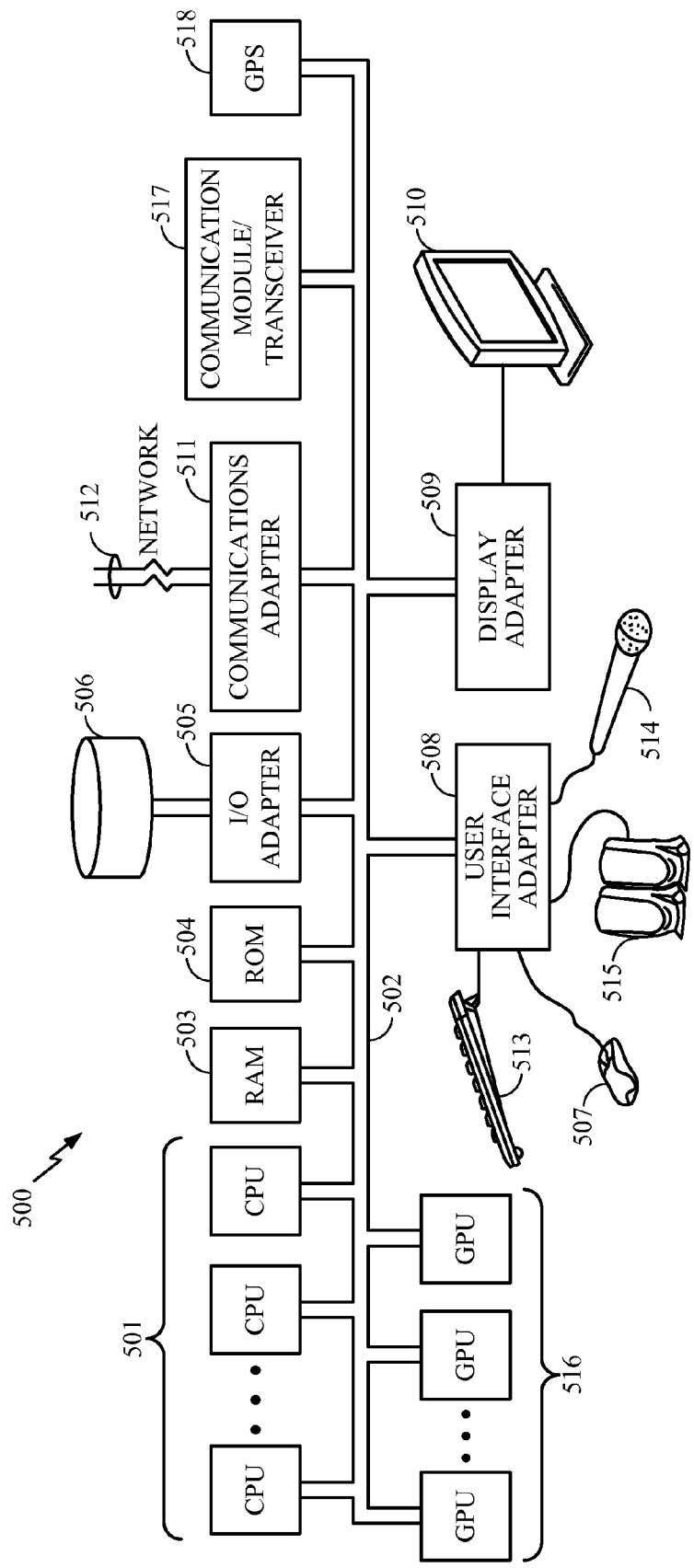
FIG. 5 illustrates an exemplary computer system which may be employed to implement PDS receiver therein according to certain aspects.

FIG. 5 illustrates an exemplary computer system 500 which may be employed to implement a PDS receiver therein according to certain aspects. A central processing unit ("CPU" or "processor") 501 is coupled to a system bus 502. The CPU 501 may be any general-purpose processor. The present disclosure is not restricted by the architecture of the CPU 501 (or other components of exemplary system 500) as long as the CPU 501 (and other components of system 500) supports the operations as described herein. As such the CPU 501 may provide processing to the system 500 through one or more processors or processor cores. The CPU 501 may execute the various logical instructions described herein. For example, the CPU 501 may execute machine-level instructions according to the exemplary operational flow described above in conjunction with FIGS. 3 and 4. When executing instructions representative of the operational blocks illustrated in FIGS. 3 and 4, the CPU 501 becomes a special-purpose processor of a special purpose computing platform configured specifically to operate according to the various aspects of the teachings described herein.

The computer system 500 also includes random access memory (RAM) 503, which may be SRAM, DRAM, SDRAM, or the like. The computer system 500 includes read-only memory (ROM) 504 which may be PROM, EPROM, EEPROM, or the like. The RAM 503 and ROM 504 hold user and system data and programs, as is well known in the art.

The computer system 500 also includes an input/output (I/O) adapter 505, communications adapter 511, user interface adapter 508, and display adapter 509. The I/O adapter 505, user interface adapter 508, and/or communications adapter 511 may, in certain aspects, enable a user to interact with the computer system 500 in order to input information. A communication module/transceiver 517 provides radio frequency communication capabilities to the computer system 500. A GPS receiver 518 provides satellite-enabled positioning information to be obtained in various satellite positioning systems.

The I/O adapter 505 couples a storage device(s) 506, such as one or more of a hard drive, compact disc (CD) drive, floppy disk drive, tape drive, etc., to the computer system 500. The storage devices are utilized in addition to the RAM 503 for the memory requirements associated with performing the operations associated with the SPS receivers configured according to various aspects of the present teachings. A communications adapter 511 is adapted to couple the computer system 500 to the network 512, which may enable information to be input to and/or output from the system 500 via the network 512 (e.g., the Internet or other wide-area network, a local-area network, a public or private switched telephony network, a wireless network, any combination of the foregoing). A user interface adapter 508 couples user input devices, such as a keyboard 513, a pointing device 507, and a microphone 514 and/or output devices, such as speaker(s) 515 to the computer system 500. A display adapter 509 is driven by the processor 501 or by a graphical processing unit (GPU) 516 to control the display on a display device 510 to, for example, for displaying the resulting PDS receiver location. A GPU 516 may be any of a various number of processors dedicated to graphics processing and, as illustrated, may be made up of one or more individual graphical processors. A GPU 516 processes the graphical instructions and transmits those instructions to a display adapter 509. The display adapter 509 further transmits those instructions for transforming or manipulating the state of the various numbers of pixels used by the display device 510 to visually present the desired information to a user. Such instructions include instructions for changing state from on to off, setting a particular color, intensity, duration, or the like. Each such instruction makes up the rendering instructions that control how and what is displayed on the display device 510.

It shall be appreciated that the present disclosure is not limited to the architecture of the system 500. For example, any suitable processor-based device may be utilized for implementing the PDS, including without limitation personal computers, laptop computers, computer workstations, multi-processor servers, and even mobile telephones. Moreover, certain aspects may be implemented on application specific integrated circuits (ASICs) or very large scale integrated (VLSI) circuits. In fact, persons of ordinary skill in the art may utilize any number of suitable structures capable of executing logical operations according to the aspects.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method for position location in a position determination system (PDS), said method comprising:
    receiving a request to determine a position of a PDS receiver;
    responsive to said request, retrieving location data from a plurality of wireless devices in proximity to said PDS receiver;
    evaluating reliability of a previously stored common seed location, corresponding to a previously determined satellite positioning system (SPS) location for the PDS receiver, by comparing said retrieved location data to the previously stored common seed location to determine location consistency of each of said retrieved location data from the plurality of wireless devices with the previously stored common seed location, the previously stored common seed location representative of an approximate location of the PDS receiver for use in determining a satellite search window for determining the position of the PDS receiver; and
    responsive to determining said retrieved location data from the plurality of wireless devices to be consistent with said previously stored common seed location of the approximate location of the PDS receiver, injecting said previously stored common seed location of the approximate location of the PDS receiver into a positioning process of said PDS receiver to determine the position of the PDS receiver.

2. The method of claim 1 further comprising:
    responsive to determining said retrieved location data to be inconsistent with said common seed location, comparing said retrieved location data to determine consistency of said retrieved location data;
    responsive to determining said retrieved location data to be consistent, calculating a new seed location based on said retrieved location data; and injecting said new seed location into said positioning process.

3. The method of claim 2 wherein said comparing comprises:

comparing each of said retrieved location data to a reliability hierarchy of a type of said retrieved location data.

4. The method of claim 3 wherein said type of said retrieved location data includes one or more of:
a mobile country code (MCC);
a cell site identifier (ID);
a PDS signal;
a short range wireless transmitter ID;
a television broadcast transmitter ID; and
a commercial radio broadcast transmitter ID.

5. The method of claim 3 further comprising:
searching a database of location data using an index to said database, wherein said index is associated with said type of said retrieved location data.

6. The method of claim 3 further comprising:
determining when inconsistent ones of said retrieved location data originate from said type having a low reliability according to said reliability hierarchy, said method further comprising:
rejecting said inconsistent ones of said retrieved location data that originate from said type having said low reliability; and
determining that said remaining ones of said retrieved location data not rejected have said consistency of said retrieved location data.

7. The method of claim 2 further comprising:
calculating a refined location using location information from each of said retrieved location data determined to be consistent; and
using said refined location as said new seed location.

8. The method of claim 2 further comprising:
responsive to determining at least two of said retrieved location data to be consistent, comparing a predicted detectability range of each of said plurality of wireless devices from which said at least two of said consistent retrieved location data is received; and
selecting said new seed location as one of said at least two of said retrieved location data received from one of said plurality of wireless devices having a closest said predicted detectability range.

9. A satellite positioning system (SPS) receiver comprising:
a processor;
a memory;
a location retrieval application stored on said memory, wherein, when executed by said processor, said location retrieval application configures said SPS receiver to obtain a plurality of location data from a plurality of wireless devices in proximity to said SPS receiver;
a consistency process stored on said memory, wherein, when executed by said processor, said consistency process evaluates reliability of a previously stored common seed location, corresponding to a previously determined satellite positioning system (SPS) location for the SPS receiver, to determine whether each of said plurality of location data of locations of the plurality of wireless devices is consistent with the previously stored common seed location, the previously stored common seed location representative of an approximate location of the SPS receiver for use in determining a satellite search window for determining the position of the SPS receiver; and
a SPS process, wherein, when executed by said processor, said SPS process determines parameters for locating at least one SPS satellites used to determine a global position of said SPS receiver, wherein, when said executing consistency process determines said plurality of location data of the locations of the plurality of wireless devices to be consistent with said previously stored common seed location of the approximate location of the SPS receiver, said previously stored common seed location of the approximate location of the SPS receiver is injected into said SPS process to determine the position of the SPS receiver.

10. The SPS receiver of claim 9 wherein said consistency process further determines whether at least two of said plurality of location data is consistent, when said plurality of location data is found to be inconsistent with said common seed location;
and wherein, responsive to determining said at least two of said plurality of location data are consistent, said consistency process calculates a new seed location based on said consistent at least two of said plurality of location data, wherein said new seed location is injected into said SPS process.

11. The SPS receiver of claim 10 further comprising:
a reliability hierarchy stored on said memory, said reliability hierarchy identifying a set of data types arranged according to level of reliability, wherein, when executed by said processor, said consistency process is further configured to rank said compared plurality of location data according to said reliability hierarchy, and wherein said consistency process is further configured to discard inconsistent ones of said plurality of location data having a lower rank in said reliability hierarchy and group consistent higher ranked ones of said plurality of location data into consistent location data.

12. The SPS receiver of claim 10 wherein, when executed by said processor, said consistency process is further configured to calculate a detail location using at least one of said plurality of location data, and wherein said detail location is used as said new seed location injected into said SPS process.

13. The SPS receiver of claim 10 wherein, responsive to determining at least two of said plurality of location data to be consistent, said executing consistency process compares a predicted detectability range of each of said plurality of wireless devices from which said consistent at least two of said plurality of location data is received; and selects said new seed location as one of said at least two of said plurality of location data received from one of said plurality of wireless devices having a closest said predicted detectability range.

14. The SPS receiver of claim 9 further comprising: a plurality of antenna, wherein each of said plurality of location data is received using a corresponding one of said plurality of antenna.

15. A computer readable medium including program code stored thereon, comprising:
program code to receive a request to determine a position of a PDS receiver;
program code, executable in response to said request, to retrieve location data from a plurality of wireless devices in proximity to said PDS receiver;
program code to evaluate reliability of a previously stored common seed location, corresponding to a previously determined satellite positioning system (SPS) location for the PDS receiver, through comparison of said retrieved location data to determine location consistency of each of said retrieved location data from the plurality of wireless devices with the previously stored common seed location, the previously stored common seed location representative of an approximate location of the PDS receiver for use in determining a satellite search window for determining the position of the PDS receiver; and program code, executable in response to determining said retrieved location data from the plurality of wireless devices to be consistent with said previously stored common seed location of the approximate location of the PDS receiver, to inject said previously stored common seed location of the approximate location of the PDS receiver into a positioning process of said PDS receiver to determine the position of the PDS receiver.

16. The computer readable medium of claim 15 further comprising:

program code, executable in response to determining said retrieved location data to be inconsistent with said common seed location, to compare said retrieved location data to determine consistency of said retrieved location data; program code, executable in response to determining said retrieved location data to be consistent, to calculate a new seed location based on said retrieved location data; and program code to inject said new seed location into said positioning process.

17. The computer readable medium of claim 16 wherein said program code to compare said retrieved location data to determine consistency of said retrieved location data comprises:

program code to compare each of said retrieved location data according to a reliability hierarchy of a type of said retrieved location data.

18. The computer readable medium of claim 17 wherein said type of retrieved location data includes one or more of:
a mobile country code (MCC);
a cell site identifier (ID);
a PDS signal;
a short range wireless transmitter ID;
a television broadcast transmitter ID; and
a commercial radio broadcast transmitter ID.

19. The computer readable medium of claim 17 further comprising:

program code to search a database of location data using an index to said database, wherein said index is associated with said type of retrieved location data.

20. The computer readable medium of claim 17 further comprising:

program code to determine when inconsistent ones of said retrieved location data originate from said type having a low reliability according to said reliability hierarchy;

program code to reject said inconsistent ones of said retrieved location data that originate from said type having said low reliability; and program code to determine that said remaining ones of said retrieved location data not rejected have said consistency of said retrieved location data.

21. The computer readable medium of claim 16 further comprising:

program code to calculate a refined location using location information from each of said retrieved location data determined to be consistent; and program code to use said refined location as said new seed location.

22. The computer readable medium of claim 16 further comprising:

program code, executable in response to determining at least two of said retrieved location data to be consistent, to compare a predicted detectability range of each of said plurality of wireless devices from which said at least two of said consistent retrieved location data is received; and program code to select said new seed location as one of said at least two of said retrieved location data received from one of said plurality of wireless devices having a closest said predicted detectability range.

23. A position determining system (PDS) receiver comprising:

means for receiving input requesting a position of said PDS receiver;

means for wirelessly retrieving location information from a plurality of wireless devices in proximity to said PDS receiver;

computer readable storage means for storing: said retrieved location information;

means for evaluating reliability of a previously stored common seed location, corresponding to a previously determined satellite positioning system (SPS) location for the PDS receiver, by determining location consistency of each of said retrieved location information from the plurality of wireless devices with the previously stored common seed location, the previously stored common seed location representative of an approximate location of the PDS receiver for use in determining a satellite search window for determining the position of the PDS receiver; and program code to define a PDS positioning process; and means for processing said program code to determine consistency and said program code to define said PDS positioning process, wherein said means for processing injects said previously stored common seed location of the approximate location of the PDS receiver into said processing PDS positioning process to determine the position of the PDS receiver when said processed program code to determine location consistency finds consistency between said retrieved location information from the plurality of wireless devices and said previously stored common seed location of the approximate location of the PDS receiver.

24. The PDS receiver of claim 23 wherein said means for processing does not inject said common seed location into said PDS positioning process when said processed program code to determine consistency finds inconsistency between said retrieved location information and said common seed location, wherein, in response to said processed program code to determine consistency finding inconsistency between said retrieved location information and said common seed location, said program code to determine consistency further compares said retrieved location information to determine consistency of said retrieved location information; responsive to determining said retrieved location information to be consistent, said processed program code to determine consistency calculates a new seed location based on said retrieved location information; and wherein said means for processing injects said new seed location into said program code to define a PDS positioning process.

* * * * *